Feb. 24, 1953 A. E. SUTIN Re. 23,624

PEG-FASTENED BUTTON

Original Filed Sept. 15, 1947

Inventor
Albert E. Sutin
by
Leon Arthurs
Attorney

Reissued Feb. 24, 1953

Re. 23,624

UNITED STATES PATENT OFFICE 23,624

PEG-FASTENED BUTTON

Albert Elliot Sutin, Toronto, Ontario, Canada

Original No. 2,538,396, dated January 16, 1951, Serial No. 773,953, September 15, 1947. Application for reissue November 15, 1951, Serial No. 256,405

4 Claims. (Cl. 24—90)

Figure 1:
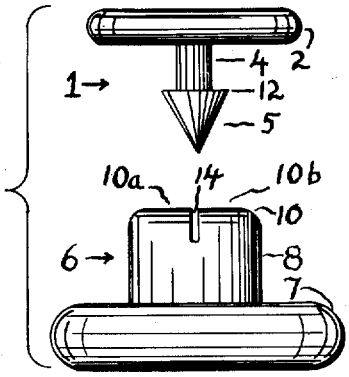

Matter enclosed in heavy brackets [ ] appears in the original patent but forms no part of this reissue specification; matter printed in italics indicates the additions made by reissue.

The present invention relates to new and useful improvements in buttons of the peg-fastened variety which are capable of attachment to fabrics without being sewn thereto.

The button particularly contemplated by the invention is largely patterned after those buttons of the prior art which were adapted to be sewn to one edge of a fabric opening and to co-operate with a button hole in the other edge thereof for closing or fastening the said opening. However, unlike the "thread-sewn" button, the instant device may carry but a single opening in the form of a socket wherein a knob at the end of a peg is non-escapably capturable; the knob piercing the fabric from one side and engaging the button on the other side thereof and the peg having retaining means to prevent it from passing wholly through the fabric. Pegs of this type are not entirely new; various forms thereof having been extensively used in association with other separable types of buttons, such as cuff studs, collar studs, emblem buttons and others, which were designed for temporary instead of permanent attachment.

Manifestly, in order to receive and retain the knob, the entrance to the button socket should not only be smaller than the knob but also capable of dilating to permit its entry and of thereafter contracting to prevent its withdrawal.

In the separable button art above described, it was neither intended nor possible to retain the knob against even a moderate pull; the knob-retaining element being too flexible for this purpose. In the art of permanently attachable buttons, on the other hand, many have heretofore required machining after the molding thereof, or required to be attached by mechanical means, or were completed or formed in more than one operation or of a plurality of parts which raised the cost thereof and made their use economically impracticable.

The present invention seeks to overcome the foregoing and other objections to the prior art by providing a button of integral or one-piece construction and with limited resiliency which is, in part, a feature of the substance of which it is formed and, in part, a product of the configuration thereof.

It is also an important object of the invention to provide a button head of a material which not only has appropriate mechanical properties but is also ornamental and attractive in appearance.

The invention further visualizes, as another of its objectives, a button head of the character described of such configuration that it may be completely formed in one operation.

Figure 2:
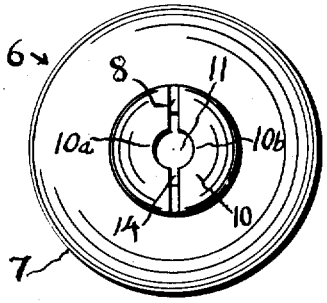
Figure 3:
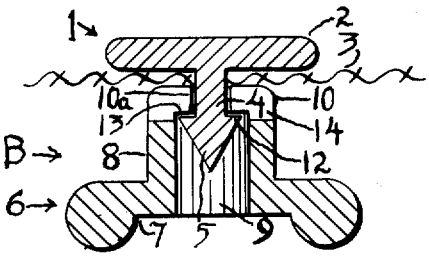
Figure 4:
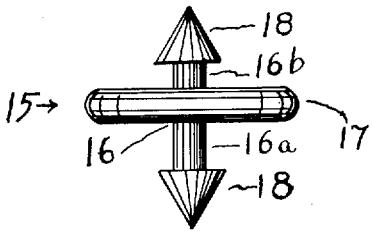

The foregoing and other unstated objects of the invention are realized in the manner and by the means disclosed by the following description of the elements, parts, and principles, which constitute the invention, a preferred embodiment whereof is illustrated, by way of example only in the annexed drawing, wherein:

Fig. 1 is an elevational view, in exploded form, of the peg and button of the present invention, Fig. 2 a top plan view of the button alone, Fig. 3 a longitudinal section through a mounted button, and Fig. 4 an elevational view of the double ended peg modification of the invention.

Throughout the enumerated views like reference numerals refer to like parts of the invention.

The peg or stud 1 which appears in Figs. 1 and 3 of the drawing and which need not necessarily be made of plastics, consists of a retaining wafer 2 and a shaft 4 rising perpendicularly therefrom and terminating in a conical, sharpened, knob 5 whose major diameter exceeds that of its support.

The materials particularly and preferably, although not restrictively, contemplated for the button of the present invention are found in that group of synthetic resinous compounds now generally known as plastics. Besides being available in a wide variety of colours, these substances can be formed with various intrinsic tensile or other properties according to the functions they are required to serve. Furthermore they are, for the most part, easily moldable and machinable.

The button 6 comprises a thin resilient button face 7 backed by a neck 8 of resilient material arranged centrally and perpendicularly thereof in which there is a bore or socket 9 terminating somewhat remotely from the end 10 of the neck 8 which carries, in turn, a smaller aperture 11 in co-axial communication with the socket 9. As shown by Fig. 3 of the drawing, the socket 9 opens on the surface of the button face 7. Thereby the button 6 is enabled to be cast or molded as an integral or one-piece unit.

It should be observed that the calibre of the socket 9 corresponds generally to the diameter of the base 12, the widest portion, of the knob 5, whereas the calibre of the aperture 11 is related to and may be slightly less than the diameter of the shaft 4. The effect of this dual calibre boring is to leave a knob retaining ring or shoulder 13 of adequate thickness at the end 10 of the neck 8.

To facilitate the passage of the knob 5 through the aperture 11, I provide two or more slits 14—14, in the end 10 of the neck 8 whose depth slightly exceeds the thickness of the shoulder 13, and which divide the said end 10 into a pair of jaws 10a—10b. The button 6 being formed of a resilient material as aforesaid, these jaws 10a—10b are capable of spreading under pressure and contracting with the release thereof in the manner to be subsequently described. Hence, when the knob 5 is forcibly intruded therebetween, the said jaws 10a—10b will spread until a complete penetration has been effected and will thereafter contract about the shaft 4.

In its present embodiment, the invention visualizes a non-separable button and peg combination B and to this end the base 12 of the knob 5 is at right angles to the shaft 4, while the interior face of the shoulder 13 also forms a right angle with the wall of the socket 9. Under these conditions, once the knob 5 has completely traversed the aperture 11, and lodged in the socket 9, its convenient withdrawal therethrough will be effectively prevented by the rectangularity of the abutting surfaces. To enhance the durability as well as the efficiency of the present invention, it is of obvious importance that play of the peg 1 in the button 6 be kept to a minimum. In part, this can be achieved by a snug fit of the knob 5 in the socket 9. In addition thereto, adequate bearing surface for the shaft 4 in the end 10 is of the highest necessity. This is obtained by suitably limiting the depth to which the socket 9 penetrates the neck 8 and so regulating the thickness of the said shoulder 13.

If this article be manufactured of a plastic material as previously recommended herein, the resulting product will require only to be cleared of the usual sprue extensions in order to be ready for immediate use, and will present a smooth, polished, and highly finished aspect. Moreover, by means of a judicious selection, with respect to resiliency and other tensile properties, of the plastic used in the manufacture of the button 6, an efficient as well as durable and attractively coloured device can be economically produced.

With further reference to the expandability of the jaws 10a—10b, this property thereof is not entirely due to their own intrinsic resiliency, they being small and purposely thickened to preclude fracture under stress. Instead, their expandability is made possible by their integral association with the much more resilient button face 7. Thus, when the jaws 10a—10b are forced apart, the pressure thereon is communicated through the button neck 8 to the button face 7 which arches in response to that pressure, coincidentally collapsing the root of the neck 8 (where it joins the button face 7); this deformation of the button 6 permitting the spreading of the jaws 10a—10b.

From the foregoing it will be apparent that the resiliency of the button face 7, which is a comparatively large and thin member, and the resistance of the neck 8 to collapse, combine with whatever resilience the jaws 10a—10b may possess, to offer strong opposition to any expansive pressure. This opposition is, of course, insufficient to prevent the entry of the tapered knob or head 5 into the socket 9, but is more than adequate to prevent its withdrawal therefrom, which would not be the case if the jaws 10a—10b were expandable independently of the rest of the button 6.

*In some cases, as in double breasted suit coats, a pair of axially aligned buttons are required. Figure 4 illustrates a peg 15 having a retaining wafer 17 carrying a shaft 16 which has lower and upper portions 16a and 16b which respectively carry conical members 18. Heads such as button head 6 of Figure 1 may be inserted on conical members 18.*

Inasmuch as the drawing has been prepared with a view to a clear description of the principles involved in the present invention, many minor variations between it and the manufactured article will occur. Similarly, many obvious modifications of the present invention have been omitted from the foregoing description for the sake of clarity and brevity. It should therefore be understood that the present embodiment is not the only form in which the pertinent inventive ideas can be expressed; the full scope thereof being defined by the claims which follow herewith.

What I claim as my invention is:

1. A non-withdrawable button assembly comprising, a stud member having a shank terminating in an enlarged conical head, the juncture between said head and shank forming an annular shoulder perpendicular to the axis of the shank, a unitary button member formed of plastic material of limited resiliency and having a disc-shaped body portion and a concentric projecting cylindrical neck portion integrally formed therewith, a bore extending through said neck and body portions of sufficient diameter to snugly accommodate said enlarged head, a constricted entrance to the bore at the top of said neck portion having a cylindrical bearing surface of substantial width dimensioned to form a tight fit about said stud shank to frictionally retain the stud against material movement relative to said body portion, an annular locking shoulder at the juncture of said bore and entrance extending at right angles to the axis of the bore to form a congruently lapping seat for the locking shoulder on said stud when said stud head is within the button neck, the free end of said neck being slit vertically dividing said locking shoulder and constricted entrance into a pair of opposed jaws for locking engagement with said shank and shoulder, said neck and jaws being of substantial thickness and reduced diameter relative to said body portion to render them materially resistant to deformation, and said disc-shaped body portion being relatively deformable, whereby a spreading force applied between said jaws at the free end of said neck is communicated through said neck to arch said body portion and separate said jaws bodily substantially without deformation sufficiently to admit said conical head.

2. A non-withdrawable button assembly comprising a stud member having a shank terminating in an enlarged conical head, the juncture between said head and shank forming an annular shoulder perpendicular to the axis of the shank, a unitary button member formed of plastic material of limited resiliency and having a disc-shaped body portion and a concentric projecting cylindrical neck portion integrally formed therewith, a bore extending through said neck and body portions of sufficient diameter to snugly accommodate said enlarged head, a constricted entrance to the bore at the top of said neck portion having a cylindrical bearing surface of substantial width dimensioned to form a tight fit about said stud shank to frictionally retain the stud against material movement relative to said body portion, an annular locking shoulder at the juncture of said bore and entrance extending at right angles to the axis of the bore to form a congruently lapping seat for the locking shoulder on said stud when said stud head is within the button neck, a vertical slit extending through said constricted entrance and locking shoulder to divide the same into a pair of opposed jaws and weaken said neck relative to a single vertical transverse plane passing through said slit, said neck and [bore] *jaws* being of substantial thickness and reduced diameter relative to said body portion to render them materially resistant to deformation, and said disc-shaped body portion being relatively deformable, whereby a spreading force applied between said jaws at the free end of said neck is communicated through said neck to arch said body portion relative to an axis lying in said vertical transverse plane and separate said jaws bodily substantially without deformation sufficiently to admit said conical head.

*3. A non-withdrawable button assembly comprising, a stud member including a retaining wafer and a shaft perpendicular to the wafer and projecting therefrom, said shaft terminating in an enlarged pointed head, a locking shoulder at the base of said head and in a plane perpendicular to the axis of the shaft, a unitary button member formed of molded material of limited resiliency and having a plate-shaped body portion and a projecting neck portion integrally formed therewith, a bore extending inwardly from one face of the button of cross-section to snugly accommodate said enlarged head, a constricted entrance to the bore at the top of said neck portion having a bearing surface of substantial length dimensioned to form a tight fit about said stud shaft to frictionally retain the stud against material movement relative to said body portion, a locking shoulder at the juncture of said bore and entrance extending transverse to the axis of the bore to form a seat for the locking shoulder on said stud when said stud head is within the button neck, the free end of said neck being slit vertically dividing said constricted entrance into*

*jaws for locking engagement with said shaft and shoulder, said neck and jaws being of substantial thickness and reduced diameter relative to said body portion, said shaft being longer than said constricted entrance by at least the thickness of the material to which the button is to be attached, said bore extending from the locking shoulder to said one face of the button, the cross-section of said bore in any plane perpendicular to the bore being no greater than that in any other plane parallel to the first one and more remote from the locking shoulder than the first one, said constricted entrance having uniform cross-section throughout the length thereof and extending from the locking shoulder to the top of said neck portion.*

*4. A non-withdrawable button assembly as defined in claim 3 in which said plate-shaped body portion is relatively deformable.*

ALBERT ELLIOT SUTIN.

REFERENCES CITED

The following references are of record in the file of this patent or the original patent:

UNITED STATES PATENTS

| Number | Name | Date |
|---|---|---|
| 303,731 | Heller | Aug. 19, 1884 |
| 384,007 | Vollmer | June 5, 1888 |
| 401,908 | Schlechter | Apr. 23, 1889 |
| 488,219 | Platt | Dec. 20, 1892 |
| 1,183,422 | Anderson | May 16, 1916 |
| 2,305,277 | Sloane et al. | Dec. 15, 1942 |
| 2,062,057 | Hobby | Nov. 24, 1936 |

FOREIGN PATENTS

| Number | Country | Date |
|---|---|---|
| 600,997 | Germany | Aug. 6, 1934 |